United States Patent
Arzelier et al.

(10) Patent No.: US 12,177,348 B2
(45) Date of Patent: *Dec. 24, 2024

(54) MISBEHAVIOUR WARNINGS IN INTELLIGENT TRANSPORTATION SYSTEMS

(71) Applicant: MALIKIE INNOVATIONS LIMITED, Dublin (IE)

(72) Inventors: Claude Jean-Frederic Arzelier, Molieres-sur-Ceze (FR); Stephen John Barrett, Haywards Heath (GB)

(73) Assignee: Malikie Innovations Limited, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 18/106,558

(22) Filed: Feb. 7, 2023

(65) Prior Publication Data

US 2023/0179415 A1    Jun. 8, 2023

Related U.S. Application Data

(63) Continuation of application No. 17/053,053, filed as application No. PCT/IB2018/000651 on May 18, 2018, now Pat. No. 11,588,636.

(51) Int. Cl.
*H04L 29/06* (2006.01)
*H04L 9/30* (2006.01)
*H04L 9/32* (2006.01)

(52) U.S. Cl.
CPC .......... *H04L 9/3066* (2013.01); *H04L 9/3263* (2013.01)

(58) Field of Classification Search
CPC .... H04L 9/3268; H04L 9/3066; H04L 9/3263
See application file for complete search history.

(56) References Cited

U.S. PATENT DOCUMENTS

| | | |
|---|---|---|
| 11,588,636 B2 | 2/2023 | Arzelier et al. |
| 2011/0083011 A1 | 4/2011 | Dicrescenzo |
| 2016/0140842 A1* | 5/2016 | Park ............. G08G 1/0112 340/905 |
| 2017/0359365 A1 | 12/2017 | Van Den et al. |
| 2019/0312738 A1 | 10/2019 | Barrett et al. |
| 2021/0144003 A1 | 5/2021 | Arzelier et al. |

OTHER PUBLICATIONS

Final Office Action in U.S. Appl. No. 17/053,053, dated Jul. 1, 2022, 11 pages.

(Continued)

*Primary Examiner* — Dao Q Ho
(74) *Attorney, Agent, or Firm* — Conley Rose, P.C.; J. Robert Brown, Jr.

(57) ABSTRACT

A method for misbehaviour warnings in an intelligent transportation system (ITS) including determining at a network server that an ITS station is misbehaving. In response to determining that the ITS station is misbehaving, the network server transmits a misbehaviour warning message to the ITS station indicating that the ITS station is misbehaving. In response to transmitting the misbehaviour warning message and determining that the ITS station is continuing to misbehave, the network server includes information of the ITS station in a certificate revocation list (CRL) and transmits the CRL.

17 Claims, 5 Drawing Sheets

(56) References Cited

OTHER PUBLICATIONS

International Search Report and Written Opinion in International Appln. No. PCT/IB2018/000651, mailed on Nov. 21, 2019, 10 pages.
Moore et al., "Fast exclusion of errant devices from vehicular networks." 2008 5th Annual IEEE Communications Society Conference on Sensor, Mesh and Ad Hoc Communications and Networks, 2008, 9 pages.
Non-Final Office Action in U.S. Appl. No. 17/053,053, dated Dec. 20, 2021, 14 pages.
Notice of Allowance in U.S. Appl. No. 17/053,053, dated Oct. 21, 2022, 12 pages.

* cited by examiner

```
MwlContents ::= SEQUENCE {
        version Uint8 (1),
        mwlSeries MwlSeries,
        cracaId HashedId8,
        issueDate Time32,
        nextMwl Time32,
typeSpecific CHOICE {
        fullHashMwl ToBeSignedHashIdMwl,
        deltaHashMwl ToBeSignedHashIdMwl,
        fullLinkedMwl ToBeSignedLinkageValueMwl,
        deltaLinkedMwl ToBeSignedLinkageValueMwl,
        ...
     }
}
```

FIG. 4 — 400

```
EndEntityMaInterfacePDU::= CHOICE {
        misbehaviorReport MisbehaviorReportContents,
        informationQuery InformationQueryContents
...
}
InformationQueryContents ::= SEQUENCE {
        version                    Uint8(1),
        generationTime             Time32,
        requestMisbehaviorReportType    RequestMisbeheaviorReportType,
        includeEvidentiaryData     IncludeEvidentiaryData
...
}
RequestMisbehaviorReportType ::= CHOICE {
        allMisbhevaiorReports           AllMisbehaviorReports,
        sampledMisbehaviorReports        SampledMisbehaviorReports,
...
}
```

FIG. 5 — 500

```
MaEndEntityInterfacePDU::= CHOICE {
        informationQueryResponse    InformationQueryResponse,
...
}
InformationQueryResponse ::= SEQUENCE {
MisbehaviorReportContents SEQUENCE SIZE (0..Max) OF Samples
}
MisbehaviorReportContents ::= SEQUENCE {
        version             Uint8(1),
        generationTime      Time32,
        policyFilename      PolicyFilename,
        reportType          ReportType,
        evidentiaryData     SEQUENCE (SIZE(1..3)) OF Evidence,
...
}
```

FIG. 6 — 600

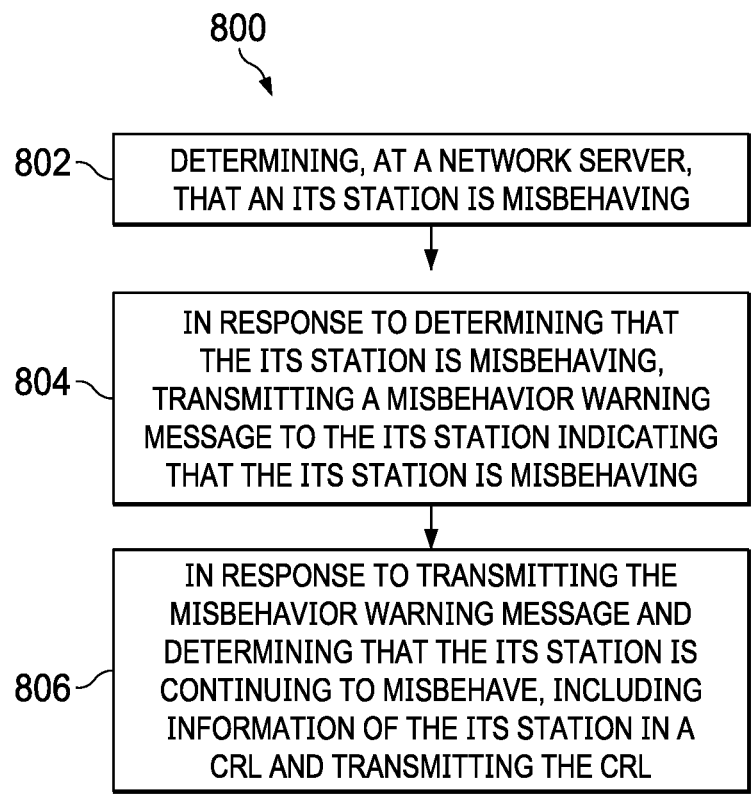
FIG. 8
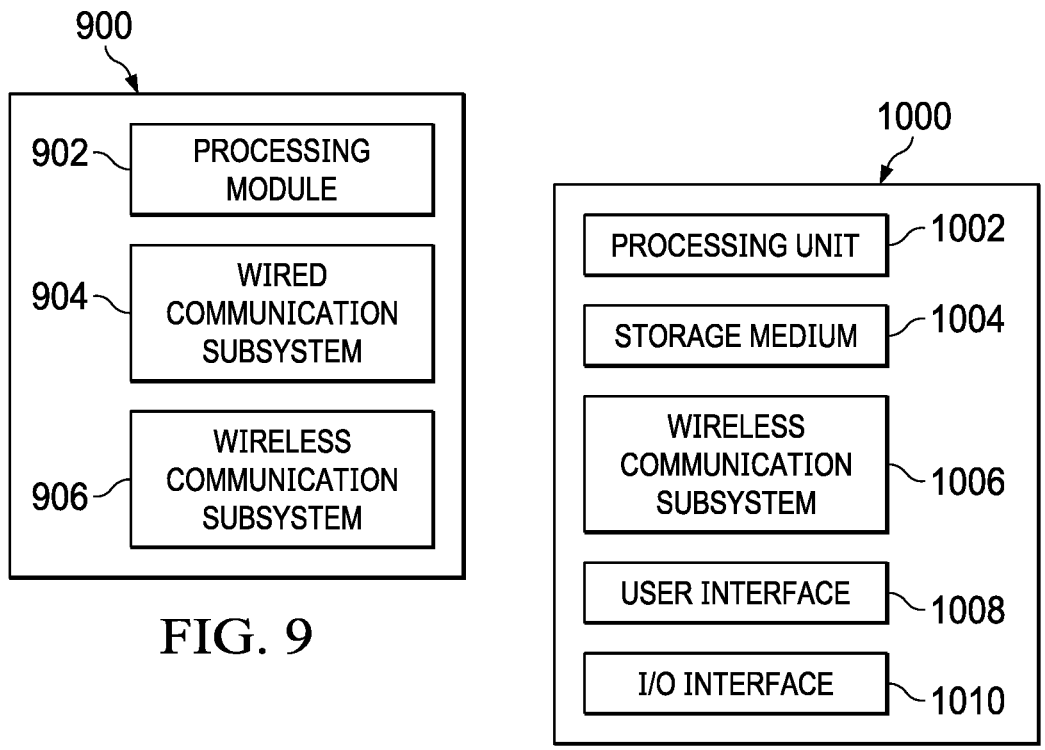
FIG. 9
FIG. 10

MISBEHAVIOUR WARNINGS IN INTELLIGENT TRANSPORTATION SYSTEMS

CROSS-REFERENCE TO RELATED APPLICATIONS

This application is a continuation of and claims the benefit of priority to U.S. application Ser. No. 17/053,053 filed Nov. 4, 2020; which claims the benefit of priority to a National Stage application under 35 U.S.C. § 371 of International Application No. PCT/IB2018/000651, having an International Filing Date of May 18, 2018. The disclosure of the prior applications are each and together part of the disclosure of this application, and is incorporated in its entirety into this application.

TECHNICAL FIELD

This disclosure relates to misbehaviour warnings in an intelligent transportation system.

BACKGROUND

An intelligent transportation system (ITS) or a vehicle-to-everything (loosely termed "V2X") network provides information communications among ITS stations and network nodes (or network servers). For example, an ITS station can be deployed on a vehicle or an item of infrastructure (e.g., a traffic light, a traffic sign, or a building) and may have sensors to measure the ITS station's conditions or surrounding environment. An ITS station can also be a device having sensors carried by a pedestrian or a cyclist. An ITS station can have transceivers to communicate with other ITS stations and network nodes. For example, when a vehicle brakes, the vehicle can communicate with neighboring vehicles so that vehicles behind it can slow down. A vehicle can also communicate with a network node, e.g., report a car accident, so that the network can notify vehicles in the area of the car accident. The ITS or V2X network can improve road safety and transportation efficiency (e.g., reducing fuel consumption).

DESCRIPTION OF DRAWINGS

FIG. 4 illustrates an example message format for an MWL message, according to some implementations of the present disclosure.

FIG. 5 illustrates an example message format for an information query message, according to some implementations of the present disclosure.

FIG. 6 illustrates an example message format for an information query response message, according to some implementations of the present disclosure.

FIG. 8 is a flowchart illustrating an example method for misbehaviour warnings in an ITS system, according to some implementations of the present disclosure.

FIG. 9 is a schematic illustrating an example network node, according to some implementations of the present disclosure.

FIG. 10 is a schematic illustrating an example ITS station, according to some implementations of the present disclosure.

Like reference numbers and designations in the various drawings indicate like elements.

DETAILED DESCRIPTION

Figure 1:
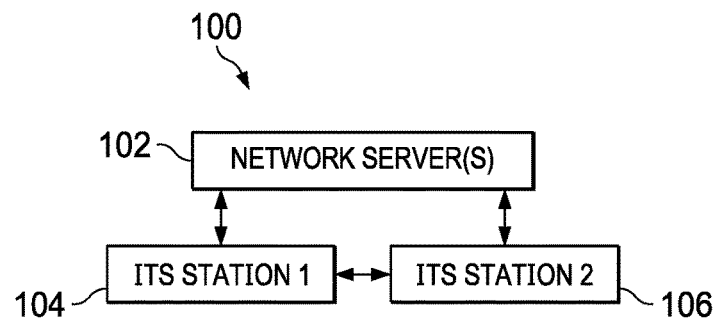
FIG. 1 is an example intelligent transportation system (ITS) providing misbehaviour warnings, according to some implementations of the present disclosure.

The present disclosure is directed to misbehaviour warnings in an intelligent transportation system (ITS) or a vehicle-to-everything (loosely termed "V2X") network. In some cases, an ITS station can malfunction or misbehave and transmit untrustworthy or erroneous messages. For example, a vehicle is moving forward at 40 miles per hour (mph), however due to a broken sensor, the vehicle sends a message to neighboring vehicles reporting a backward movement at 40 mph. The network can provide information of misbehaving vehicles, (e.g., the network can broadcast identifiers of misbehaving vehicles) so that other vehicles can ignore messages from those misbehaving vehicles.

In some cases, messages transmitted within an ITS (also called ITS message or V2X message) can include a certificate. For example, an ITS message can include message content, a signature of the message (e.g., formed by performing a hash of the message content and applying a private key of the sending ITS station on the hash of the message content), and a certificate including information of a public key of the sending ITS station signed by a private key of a certificate authority (CA). At the receiving ITS station, after verifying the certificate using a public key of the CA, the receiving ITS station can determine the sender's public key from the certificate. After verifying that the message content is indeed signed by a private key that is paired with the public key provided in the certificate, the receiving ITS station can extract the message content. The network (e.g., the CA) can generate and issue certificates to ITS stations.

For providing privacy and avoiding one ITS station from tracking locations of another ITS station, an ITS station can be provided with a number of certificates which the ITS station can use in a period of time and which the ITS station thereafter discards. For example, the network (e.g., the CA) can provide a vehicle with 20 certificates to use in a given week. Use of these certificates may be cycled through, e.g., each certificate used for 5 minutes after which the next certificate is used. In some cases, the vehicle may be issued with many years' worth of certificates (e.g., 3 years). Each certificate can include a different pseudonym as an identifier.

In some cases, the network (e.g., a misbehaviour authority (MA)) can determine whether messages from an ITS station are trustworthy (whether the ITS station is misbehaving). If an ITS station can no longer be trusted, that ITS station's certificates are revoked. The network can include information of the revoked certificates in a certificate revocation list (CRL) and broadcast the CRL (e.g., broadcast the CRL in a geographical area). Based on the CRL, a recipient of an ITS message can check whether a certificate in the received message is still valid.

The use of the CRL to revoke certificates of misbehaving ITS stations can be onerous in processing and memory terms for the ITS stations receiving ITS messages. Processing involves these ITS stations comparing the certificate in each received message with all certificates indicated in the CRL to determine whether the received message can be trusted. The amount of processing is affected by the arrival rate of ITS messages, which might be high and on an order of, e.g., 1000 ITS messages/second. The amount of processing is also dependent on the size of the CRL, which can be large. The size of the CRL can be a function of the ITS station population in a geographic area, misbehaviour rates of the ITS stations, and certificate lifetime (e.g., each vehicle may be issued certificates of 3 years). The amount of memory for storing the CRL at the ITS station can be proportional to the CRL size. Therefore, it is desirable to reduce the CRL size and thereby reduce processing and memory burden on ITS stations.

In some cases, for reducing the CRL size, ITS stations which are operated by malicious users who are intentionally misbehaving and ITS stations operated by well-disposed users who are unintentionally misbehaving can be separated. The size of the CRL can be reduced by including the misbehaving ITS stations that are operated by malicious users, but not misbehaving ITS stations operated by well-disposed users. For example, a malicious user of an ITS station could intentionally make the ITS station send untrustworthy messages. In some other cases, a well-disposed user of an ITS station may find that his/her ITS station sends out untrustworthy messages because the ITS station may have been compromised, e.g., by a virus or due to some other type of malfunction such as a broken sensor. A misbehaving ITS station is given opportunity(ies) to self-police and to remove itself from the ITS (or stop transmitting erroneous messages). If the misbehaving ITS station stops the misbehaviour (e.g., stops transmitting erroneous messages), certificate information of the ITS station is not added to the CRL. However, if the misbehaving ITS station continues to misbehave (e.g., continues to transmit erroneous messages), certificate information of the ITS station is added to the CRL. The network can inform the ITS station of the opportunity to self-police. In some cases, the network maintains a misbehaviour warning list (MWL) including the ITS stations that are being given opportunities to self-police. For instance, a misbehaving ITS station operated by a well-disposed user may send erroneous messages due to a broken sensor. When the network notifies the ITS station to self-police, the ITS station operated by a well-disposed user may stop transmitting the erroneous messages (e.g., the user may get the broken sensor fixed and the ITS station stops sending erroneous messages). However, an ITS station operated by a malicious user may be made to continue to send erroneous messages despite the notification to self-police.

FIG. 1 is an example ITS 100 providing misbehaviour warnings, according to some implementations of the present disclosure. In some implementations, a network server (e.g., an MA) determines that an ITS station is misbehaving (e.g., sending out erroneous messages, sending messages when it should not, or not sending messages when it should). In response to determining that the ITS station is misbehaving, the network server transmits a misbehaviour warning message to the ITS station indicating that the ITS station is misbehaving. In response to transmitting the misbehaviour warning message and determining that the ITS station is continuing to misbehave (e.g., continuing to send out erroneous messages), the network server includes information of the ITS station in a certificate revocation list (CRL) and broadcasts the CRL. In some cases, the misbehaviour warning message includes information of the nature of misbehaviour for helping the ITS station to identify the malfunction. In some cases, in response to determining that the ITS station is misbehaving, the network server includes the information of the ITS station in a misbehaviour warning list (MWL), where the MWL is different than the CRL. In response to determining that the ITS station is continuing to misbehave, the network server removes the information of the ITS station from the MWL and places the ITS station on the CRL. The information of the ITS station included in the CRL or MWL can be an identifier of the ITS station, such as a linkage seed associated with a certificate issued to the ITS station by a CA. In some cases, elliptic-curve Qu-Vanstone (ECQV) implicit certificates are used. An example of the ITS station can be deployed on a vehicle.

In some cases, the network server determines that a second ITS station is misbehaving. In response to determining that the second ITS station is misbehaving, the network server includes information of the second ITS station in the MWL and transmits a second misbehaviour warning message to the second ITS station. In some cases, the second misbehaviour warning message includes information of the nature of misbehaviour for helping the second ITS station to identify the malfunction. In response to transmitting the second misbehaviour warning message and determining that the second ITS station is no longer misbehaving (e.g., stops sending out erroneous messages, or stops abstaining to send messages when it should), the network server removes the information of the second ITS station from the MWL, and the second ITS station is not placed on the CRL. In some cases, in response to transmitting the second misbehaviour warning message, the network server receives from the second ITS station a query message requesting information of the nature of misbehaviour. In some cases, the network server determines that the second ITS station is no longer misbehaving when the network server receives an indication from the second ITS station indicating that the second ITS station is no longer misbehaving.

The misbehaviour warning management described herein can reduce the CRL size and thereby reduce processing and memory burdens for the ITS stations that receive ITS messages. The described approach also provides improved user experience. For example, information of the nature of misbehaviour is provided to the misbehaving ITS station to help the user to identify the malfunction. In addition, the CA does not revoke certificates and does not need to issue new certificates to the ITS station which performs self-policing and fixes the misbehaviour, therefore reducing processing burden on the CA and reducing administrative burden on the user.

The example ITS 100 includes one or more network servers 102 and ITS stations 104 and 106. The ITS stations 104 and 106 can be an entity having sensor(s) to measure its own condition and/or surrounding environment. For example, the ITS stations 104 and 106 can be deployed on a vehicle or on infrastructure (such as a traffic light, a traffic sign, or a building) which may have sensor(s). The ITS stations 104 and 106 can also be a device having sensor(s) carried by a pedestrian or a cyclist. The ITS stations 104 and 106 can have transmitter(s) and receiver(s) to communicate with other ITS stations and/or the network server(s) 102. For example, the ITS station 104 (e.g., a vehicle) can have a sensor for detecting a brake. If a brake is applied to the ITS station 104, the ITS station 104 can send a message to the neighboring ITS station 106 (e.g. the ITS station 106 is behind the ITS station 104) so that the ITS station 106 can slow down. The ITS station 104 can also send a message to the network server(s) 102, e.g., to report a car accident, and the network server(s) 102 can notify other ITS stations in the area of the car accident.

The network server(s) 102 can include one or more network servers. The network server(s) can have functionalities such as MA functionality for managing misbehaviour warning (e.g., maintaining the CRL and the MWL), CA functionality for issuing certificates, and others. Different functionalities can be on a same network server or different network servers.

In some cases, the ITS station 104 can communicate directly with neighboring ITS stations (e.g., the ITS station 106, including possible ITS stations implemented in Road Side Units) using short-range or medium-range wireless technologies, such as Zigbee, Bluetooth, infrared light, Wi-Fi, or device-to-device communications supported by LTE-Advanced or 5G radio access technologies. Wireless local area network (WLAN) based device-to-device technologies such as IEEE 802.11p and evolutions thereof may also be used for this purpose. The ITS stations 104 and 106 can also communicate with each other or with network server(s) 102 or with traffic infrastructure (Road Side Units) using radio access technologies, such as Global System for Mobile Communications (GSM), Interim Standard 95 (IS-95), Universal Mobile Telecommunications System (UMTS), CDMA2000 (Code Division Multiple Access), Evolved UMTS, Long-Term Evolution (LTE), LTE-Advanced, fifth generation (5G), or WLAN. The communication links among ITS stations and the communication links between ITS stations and network servers can use licensed or unlicensed frequency spectrums. The communication links among ITS stations can use the same or different frequency spectrums from the communication links between ITS stations and network servers.

In some cases, the ITS stations 104 and 106 may include a Mobile Equipment (ME) device and a removable memory module, such as a Universal Integrated Circuit Card (UICC) that includes a subscriber identity module (SIM), a Universal SIM (USIM), or a Removable User Identity Module (R-UIM). An ITS station can be a handheld or portable device such as a personal digital assistant (PDA), tablet, mobile phone, laptop, or another user equipment. The ITS functionality could be provided by an application pre-configured on or downloadable to such a device.

Figure 2:
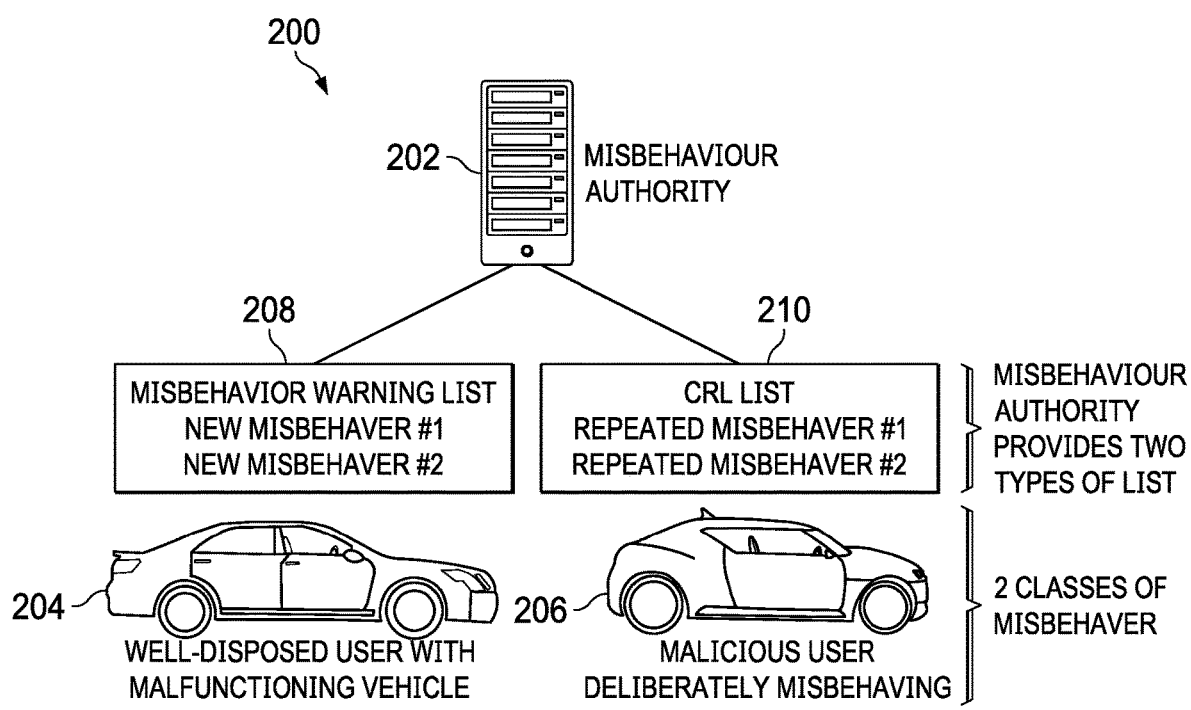
FIG. 2 illustrates a misbehaviour warning list (MWL) and a certificate revocation list (CRL), according to some implementations of the present disclosure.

FIG. 2 illustrates an MWL and a CRL, according to some implementations of the present disclosure. As discussed earlier, the described approach separates misbehaving ITS stations 204 operated by well-disposed users (the ITS station heeds the misbehaviour warning) from misbehaving ITS stations 206 operated by malicious users (the ITS station ignores the misbehaviour warning). An MA network server 202 can maintain an MWL 208 and a CRL 210. The CRL 210 can include identity information (e.g., certificate information) of misbehaving ITS stations operated by malicious users or repeatedly misbehaving ITS stations. The MWL 208 can include identity information (e.g., certificate information) of newly misbehaving ITS stations or misbehaving ITS stations operated by well-disposed users. The MA 202 can broadcast the MWL 208 and the CRL 210. In some cases, as will be discussed in FIGS. 3 and 7, the MA 202 may not broadcast the MWL 208. Instead, the MA 202 can send a point-to-point misbehaviour warning message to the misbehaving ITS station to notify the misbehaviour.

As discussed earlier, each ITS message can include a certificate. The certificate can be an explicit certificate or an implicit certificate. An explicit certificate (e.g., X.509 certificate) can include the sender's public key, administrative information (such as an identity of the issuing CA, a validity period, an identity of the sender, crypto algorithm identifiers), and a signature of the certificate signed with the CA's private key. The signature of the certificate is generated by first performing a hash of the information in the certificate (sender public key and administration information) to produce a fixed length scrambled block of data (called a "hash"), and then applying the CA's private key to this hash.

An implicit certificate can be an ECQV implicit certificate (e.g., specified in IEEE 1609.2, which refers to Standards for Efficient Cryptography (SEC) Group (SECG) SEC 4). An ECQV certificate does not explicitly include a sender's public key. An ECQV certificate includes administrative information and an elliptic-curve (EC) point, called the public reconstruction key. The sender's public key is calculated by the receiver using a short calculation which uses the issuing CA's public key, the public reconstruction key, and the administrative information. ECQV certificates are smaller than explicit certificates because no signature is included. Therefore, EVQV certificates can be used in resource constrained environments. In some cases, an ECQV certificate can be at least 64 bytes smaller than an explicit certificate.

For reducing the size of the certificate information to be included in the MWL or CRL, the CA can use hash chains to generate certificates. For example, each ITS station can have a seed value (also called linkage seed as described in, e.g., Crash Avoidance Metrics Partnership (CAMP) security credential management system (SCMS) specification: security credential management system proof-of-concept implementation—EE requirements and specifications supporting SCMS software release 1.1). The CA can start with the linkage seed and hash it, then hash this hash, then hash this hash, and so on. The result is a sequence of values, called linkage values, each of which is the hash of the previous linkage value. When generating a certificate (e.g., an ECQV certificate), the CA places a linkage value (or a portion thereof) in the administrative portion of the certificate. To revoke or warn an ITS station, the MA places the linkage seed of that ITS station in the CRL or MWL. A recipient of an ITS message can calculate possible linkage values based on the linkage seeds in the CRL and compare the calculated linkage values to the linkage value in the certificate of the received ITS message. If the linkage value in the received certificate matches one of the linkage values calculated from the linkage seeds in the CRL, the received ITS message is considered to be untrustworthy and rejected. In some cases, for privacy reasons, each ITS station can have a pair of linkage seeds for generating linkage values.

Figure 3:
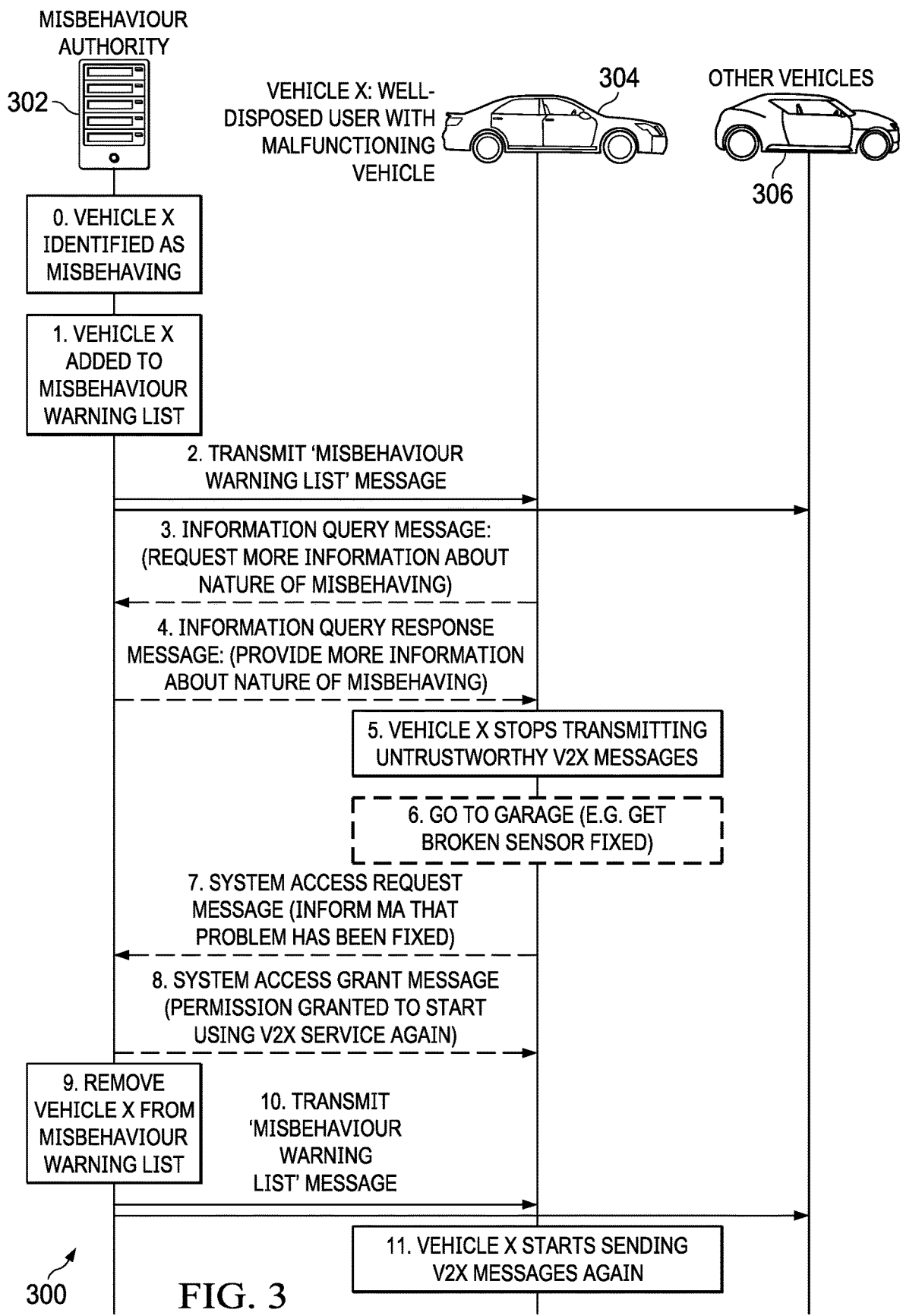
FIG. 3 is a data flow diagram illustrating misbehaviour warnings for an ITS station operated by a well-disposed user, according to some implementations of the present disclosure.

FIG. 3 is a data flow diagram 300 illustrating misbehaviour warnings for an ITS station operated by a well-disposed user, according to some implementations of the present disclosure. In some implementations, various steps of the data flow diagram 300 can be run in parallel, in combination, in loops, or in any order. The steps shown with dashed lines in the data flow diagram 300 are optional steps. The data flow diagram 300 includes an MA 302 (e.g., a MA network server), Vehicle X or a misbehaving ITS station operated by a well-disposed user (or a user who takes corrective action in response to receiving a warning message) 304, and other ITS station(s) 306 (e.g., other vehicles different than Vehicle X).

At step 0, the MA 302 identifies that Vehicle X 304 is misbehaving. In some cases, the MA 302 can identify a misbehaving ITS station based on reports from other ITS stations. For example, Vehicle Z can report to the network if it identifies an inconsistency between its observations of Vehicle X 304 and an ITS message received from Vehicle X 304. For instance, using sensors (such as radar, cameras, or lidar) Vehicle Z observes that Vehicle X 304 is moving forward. However, the ITS message received from Vehicle X 304 indicated a backward movement. As a result, Vehicle Z can send a misbehaviour report to the MA 202 to register its "concerns" about Vehicle X 304. Vehicle Z can include an identity of Vehicle X 304 in the misbehaviour report. In some cases, the misbehaviour report can include the linkage value present in the certificate of the ITS message received from Vehicle X 304. The MA 302 may determine that Vehicle X 304 is untrustworthy or misbehaving after receiving such misbehaviour reports on Vehicle X 304 from a number of vehicles, where the number exceeds a threshold. In some cases, based on the linkage value reported in the misbehaviour report, the MA 302 can determine the linkage seed associated with the linkage value.

In some cases, Vehicle Z may include additional information or data points in the misbehaviour report for helping the MA 302 to determine whether Vehicle X 304 is misbehaving. For example, the misbehaviour report can include that speed/acceleration/deceleration/direction measured at time p and location q by the lidar of Vehicle Z were not consistent with those reported by Vehicle X 304 in the ITS messages at similar time s and location t. The misbehaviour report can also indicate that an event-triggered warning transmitted by Vehicle X 304 did not correspond to observations made by Vehicle Z.

At step 1, the MA 302 places an identifier of Vehicle X 304 on the MWL to give Vehicle X 304 opportunity(ies) for self-policing. The identifier can be used to uniquely identify a vehicle. In some cases, a linkage seed (or a pair of linkage seeds) corresponding to the vehicle is placed on the MWL. Other unique identifiers could alternatively be used, e.g., a CA allocated pseudonym, a certificate enrollment identifier, or a vehicle identification number (VIN).

At step 2, the MA 302 sends an MWL message including the MWL. For example, the MWL can include identifiers (e.g., linkage seed) of the vehicles being warned. In some cases, the MWL message is transmitted to multiple vehicles (e.g., both misbehaving and well-behaving vehicles in a geographical area) using a broadcast channel (point-to-multipoint channel) or unicast channels (point-to-point channel). After receiving the MWL, Vehicle X 304 can determine whether it is on the MWL. For example, Vehicle X 304 can derive linkage values based on the linkage seeds in the MWL. If one or more of the derived linkage values match one or more linkage values in the certificates issued by the CA (i.e., the certificates the CA issued to Vehicle X 304), Vehicle X 304 determines that it is on the MWL and being warned.

FIG. 4 illustrates an example message format 400 for an MWL message, according to some implementations of the present disclosure. The message format 400 can be included in IEEE 1609.2 standards. The fields in the message format 400 have the following meaning:

version is the version number of the MWL.

mwlSeries represents the series of MWLs to which this MWL belongs.

cracaId contains the low-order eight octets of the hash of the certificate of the Certificate Revocation Authorization CA (CRACA) that ultimately authorized the issuance of this MWL. This is used to determine whether the warning information in an MWL is relevant to a particular certificate as specified in 5.1.3.2 of IEEE 1609.2-2016. In a valid signed MWL as specified in 7.4 of IEEE 1609.2-2016 the cracaId is consistent with the associatedCraca field in the Service Specific Permissions as defined in 7.4.3.3 of IEEE 1609.2-2016.

issueDate specifies the time when the MWL was issued.

nextMwl contains the time when the next MWL with the same mwlSeries and cracaId is expected to be issued. The MWL is invalid unless nextMwl is strictly after issueDate. This field is used to set the expected update time for warning information associated with the (cracaId, mwlSeries) pair as specified in 5.1.3.6 of IEEE 1609.2-2016.

typeSpecific contains the MWL body:

fullHashMwl contains a full hash-based MWL, i.e., a listing of the hashes of all certificates that: contain the indicated cracaId and mwlSeries values, and are warned by hash, and have been warned, and have not expired.

deltaHashMwl contains a delta hash-based MWL, i.e., a listing of the hashes of all certificates that: contain the specified cracaId and mwlSeries values, and are warned by hash, and have been warned since the previous MWL that contained the indicated cracaId and mwlSeries values.

fullLinkedMwl contains a full linkage ID-based MWL, i.e., a listing of the individual and/or group linkage data for all certificates that: contain the indicated cracaId and mwlSeries values, and receive warning indicated by linkage data, and have been warned, and have not expired.

deltaLinkedMwl contains a delta linkage ID-based MWL, i.e., a listing of the individual and/or group linkage data for all certificates that: contain the specified cracaId and mwlSeries values, and are warned by use of linkage data, and have been warned since the previous MWL that contained the indicated cracaId and mwlSeries values.

Back to FIG. 3, in some cases, the MA 302 maintains the MWL without broadcasting the MWL. In some cases, if the MA 302 is aware of (or configured with) a networking identifier for Vehicle X 304, such as a Mobile Station International Subscriber Directory Number (MSISDN) or an Internet Protocol (IP) address, the MA 302 can directly send a misbehaviour warning message to Vehicle X 304 indicating that Vehicle X 304 is misbehaving without including the MWL. In other words, at step 2, instead of broadcasting an MWL message, the MA 302 can unicast a misbehaviour warning message to the misbehaving vehicle. In some cases, the misbehaviour warning message can also include detailed information of misbehaviour (e.g., information regarding the nature of misbehaviour as discussed in step 3) for helping Vehicle X 304 to identify the cause of misbehaviour (e.g., identify the broken sensor).

At step 3, optionally (if the detailed information of misbehaviour is not provided in step 2) the misbehaving Vehicle X 304 can send an information query message to the MA 302 requesting the detailed information of misbehaviour. The information query message can indicate what information is requested. For example, the misbehaving Vehicle X 304 can query one or more of the following information regarding the nature of misbehaviour:

A full set of, or a subset of misbehaviour reports that had been provided on Vehicle X 304 by other cars;

ITS applications (e.g., as indicated by European Telecommunications Standards Institute (ETSI)-ITS Application ID) associated with the messages which were found to be untrustworthy;

Reported metrics (e.g. speed, location, time, altitude, direction, indication of braking etc.) which were found to be untrustworthy (including any combination of them that could help in assessing potential malfunctions, e.g., set of location/time information that could help the car/garage to assess that there is something wrong with the speed or acceleration/deceleration);

Results of analysis performed by the MA 302 indicating potential malfunctions (e.g., faulty speed sensor, faulty braking sensor, or faulty ITS module).

FIG. 5 illustrates an example message format 500 for an information query message, according to some implementations of the present disclosure. The field RequestMisbehaviorReportType indicates that the misbehaving vehicle can request either a full set or a subset of misbehaviour reports that had been sent to the MA regarding this misbehaving vehicle. The field includeEvidentiaryData indicates whether the misbehaving vehicle wants evidentiary data to be included in the response message to the information query message.

Back to FIG. 3, in some cases, in order to route the information query message to the MA 302, Vehicle X 304 may obtain the IP address of the MA 302 through a variety of means:

Pre-configured IP address;

Pre-configured fully qualified domain name (enabling Domain Name System (DNS) look up of IP address);

Standardized method for building a fully qualified domain name (FQDN) of a MA, based on the certificate authority identifier, e.g., MA@certificate authority domain-.com. The FQDN is used in DNS look up to obtain the IP address.

In some cases, in order that only Vehicle X 304 can query the MA 302 for the information of Vehicle X 304, the MA 302 can authenticate Vehicle X 304 as follows:

Vehicle X 304 signs the information query message using its private key and include its certificate.

The MA 302 checks that the certificate is valid, checks that the message is correctly signed, and then reads out the linkage value.

The MA 302 determines whether this linkage value corresponds to one of the linkage seeds (or pairs of linkage seeds) on the MWL. If this is the case then the MA 302 can return the requested information to Vehicle X 304 as described in step 4.

At step 4, the MA 302 provides the requested detailed information of misbehaviour in an information query response message.

FIG. 6 illustrates an example message format 600 for an information query response message, according to some implementations of the present disclosure. The parameter "Samples" indicates the number of misbehaviour reports that are provided. As discussed above, the provided misbehaviour reports can be a full set or a subset of the misbehaviour reports available at the MA. The field MisbehaviorReportContents may or may not include the sub-field evidentiaryData dependent on whether the evidentiary data was requested in the information query message.

Back to FIG. 3, at step 5, Vehicle X 304 stops transmitting untrustworthy ITS messages. Based on the detailed information of misbehaviour received in step 2 or step 4, Vehicle X 304 can perform one or more of the following:

Stop transmitting all ITS messages;

Stop transmitting ITS messages associated with applications that the MA or vehicle determines to be untrustworthy, whilst continuing to transmit other ITS messages;

Stop transmitting ITS messages that include metrics which are suspected of being untrustworthy, whilst continuing to transmit other V2X messages;

Stop transmitting ITS messages that involve vehicle components that are suspected of being malfunctioning, whilst continuing to transmit other ITS messages; and Continue to transmit all ITS messages.

In the case where Vehicle X 304 continues to transmit all or some ITS messages, Vehicle X 304 can provide an indication in those messages indicating that some or all of the ITS messages from Vehicle X 304 may be untrustworthy. Vehicle X 304 can provide a further indication to indicate which message is expected to be at a risk of being untrustworthy. In some cases, Vehicle X 304 can append an indication to the ITS message indicating whether that message is at a risk of being untrustworthy.

At step 6, malfunction in Vehicle X 304 is repaired. Detailed information of misbehaviour obtained from the MA 302 in step 2 or step 4 can help in the diagnosis of the malfunction, e.g., identify the broken sensor.

At step 7, optionally Vehicle X 304 may inform the MA 302 that the malfunction has been repaired and that Vehicle X 304 intends to send ITS messages again, which had previously been blocked. For example, Vehicle X 304 can send a system access request message to the MA 302 indicating that the malfunction has been repaired and requesting a permission to re-access the ITS system.

At step 8, optionally the MA 302 can grant Vehicle X 304 permission to start sending the previously blocked ITS messages again and/or permission to stop appending messages with an indication that the message may be untrustworthy.

At step 9, upon the MA 302 determining that Vehicle X 304 is no longer misbehaving (e.g., based on the message received in step 7 indicating that the malfunction has been repaired), the MA 302 removes the identifier of Vehicle X 304 (e.g., linkage seed(s) of Vehicle X 304) from the MWL. In some cases, the MA 302 can determine that Vehicle X 304 is no longer misbehaving if no misbehaviour report has been received on Vehicle X 304 from other cars for a period of time that is longer than a threshold time period. Note that step 9 can alternatively occur at any previous point in the data flow diagram 300 when Vehicle X 304 has explicitly or implicitly indicated to the MA 302 that Vehicle X 304 is aware that it has been placed on the MWL (e.g. after step 3 or after step 7).

At step 10, an updated MWL message is broadcast including the updated MWL that does not include the identifier for Vehicle X 304. In some cases, step 10 may not be performed if the MWL message was not broadcast in step 2 and a misbehaviour warning message was transmitted instead.

At step 11, Vehicle X 304 starts transmitting ITS messages that had previously been blocked.

Figure 7:
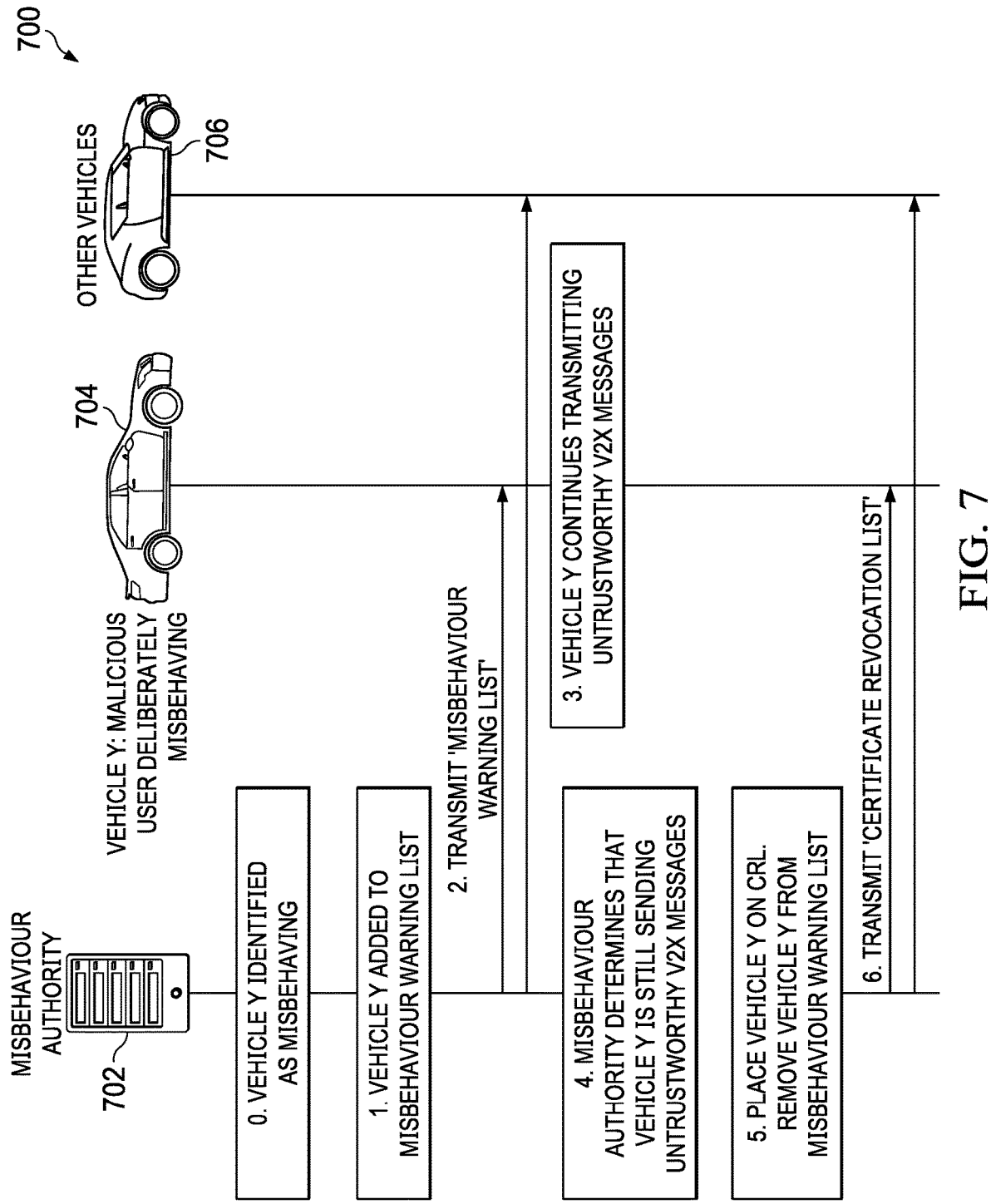
FIG. 7 is a data flow diagram illustrating misbehaviour warnings for an ITS station which does not take corrective action in response to receiving a warning message, according to some implementations of the present disclosure.

FIG. 7 is a data flow diagram 700 illustrating misbehaviour warnings for an ITS station which does not take corrective action in response to receiving a warning message, according to some implementations of the present disclosure. For example, the ITS station is operated by a malicious user or a user ignores the warning message. In some implementations, various steps of the data flow diagram 700 can be run in parallel, in combination, in loops, or in any order. The data flow diagram 700 includes an MA 702 (e.g., a MA network server), Vehicle Y or a misbehaving ITS station which does not take corrective action in response to receiving a warning message 704, and other ITS station(s) 706 (e.g., other vehicles different than Vehicle Y).

At step 0, similar to step 0 in FIG. 3, the MA 702 identifies that Vehicle Y 704 is misbehaving.

At step 1, similar to step 1 in FIG. 3, the MA 702 places an identifier of Vehicle Y 704 on the MWL so that the misbehaving Vehicle Y 704 is given opportunity(ies) to self-police.

At step 2, similar to step 2 in FIG. 3, the MA 702 broadcasts an MWL message including the MWL. In some cases, the MA 702 directly sends a misbehaviour warning message to Vehicle Y 704 indicating that Vehicle Y 704 is misbehaving without broadcasting the MWL. The misbehaviour warning message can include detailed information of misbehaviour to help Vehicle 704 to identify malfunction.

At step 3, Vehicle Y 704 continues to transmit untrustworthy ITS messages despite having been given a warning. This can happen either when the vehicle is malicious and is deliberately ignoring the warning or due to some other reason, e.g., faulty software.

At step 4, the MA 702 determines that Vehicle Y 704 continues to misbehave. For example, the MA 702 determines that Vehicle Y 704 continues to misbehave if the MA 702 does not receive an indication from Vehicle Y 704 indicating the malfunction has been repaired, e.g., within a certain time duration after sending the MWL or the misbehaviour warning message. In some cases, the MA 702 determines that Vehicle Y 704 continues to misbehave if the MA 702 continues to receive misbehaviour reports on Vehicle Y 704 from other cars after sending the MWL or the misbehaviour warning message.

At step 5, after determining that Vehicle Y 704 continues to misbehave, the identifier of Vehicle Y 704 is placed on the CRL and removed from the MWL.

At step 6, the updated CRL is broadcast to multiple vehicles (e.g., vehicles in the same area of Vehicle Y 704). After the vehicle 706 receives the CRL, the vehicle 706 can compare the identifiers in the CRL to the identifier in the certificate of the received ITS message. If there is a match, the vehicle 706 determines that the received ITS message is untrustworthy and handles it appropriately (e.g., ignore the message). For example, the vehicle 706 can derive the linkage values based on the linkage seeds in the CRL, and compare the linkage value in the received ITS message to the linkage value derived from the CRL.

In some cases, a misbehaving vehicle may be given more than one opportunity to correct its behaviour. For example, only after the vehicle has failed to correct its behaviour after a number of warnings, is the vehicle placed on the CRL. For example, the MA can send a misbehaviour warning message to a vehicle. After a certain time duration, the MA determines that the vehicle is still misbehaving and the MA can send a second misbehaviour warning message. If the vehicle continues to misbehave after a number of misbehaviour warning messages more than a threshold, the MA places the vehicle on the CRL.

FIG. 8 is a flowchart illustrating an example method 800 for misbehaviour warnings in an ITS system, according to some implementations of the present disclosure. At block 802, a network server (e.g., an MA) determines that an ITS station is misbehaving. For example, the network server can determine that the ITS station is misbehaving based on misbehaviour reports on this ITS station received from other ITS stations. At block 804, in response to determining that the ITS station is misbehaving, the network server sends a misbehaviour warning message to the ITS station indicating that the ITS station is misbehaving. In some cases, the misbehaviour warning message includes detailed information of misbehaviour (e.g., misbehaviour reports from other ITS stations) to help the ITS station to identity the malfunction. At block 806, in response to transmitting the misbehaviour warning message and determining that the ITS station is continuing to misbehave, the network server includes information of the ITS station in a CRL and broadcasts the CRL. In some cases, the network server determines that the ITS station continues to misbehave if the network server does not receive an indication from the ITS station indicating that the malfunction has been repaired. In some cases, the network server determines that the ITS station continues to misbehave if the network server continues to receive misbehaviour reports on this ITS station after transmitting the misbehaviour warning message. The information of the ITS station included in the CRL can be an identifier of the ITS station. In some cases, the identifier can be a linkage seed of the ITS station.

FIG. 9 is a schematic illustrating an example network node 900, according to some implementations of the present disclosure. For example, the network server(s) 102 and the MA servers 202, 302, and 702 can be implemented by the network node 900. The illustrated device 900 can include a processing module 902, a wired communication subsystem 904, and a wireless communication subsystem 906. The wireless communication subsystem 906 may include a receiver and a transmitter to communicate with ITS stations. The wired communication subsystem 904 can be configured to transmit and receive information between other network nodes via backhaul connections. The processing module 902 can include one or more processing components (alternatively referred to as "processors" or "central processing units" (CPUs)) capable of executing instructions related to one or more of the processes, steps, or actions described above in connection with one or more of the implementations disclosed herein. The processing module 902 can also include other auxiliary components, such as random access memory (RAM), read only memory (ROM), secondary storage (for example, a hard disk drive, flash memory or other non-transitory storage medium). The processing module 902 can execute certain instructions and commands to provide wireless or wired communication, using the wired communication subsystem 904 or the wireless communication subsystem 906. Various other components can also be included in the device 900.

FIG. 10 is a schematic illustrating an example ITS station 1000, according to some implementations of the present disclosure. The example ITS station 1000 can include a processing unit 1002, a computer-readable storage medium 1004 (for example, ROM or flash memory), a wireless communication subsystem 1006, an interface 1008, and an I/O interface 1010. The processing unit 1002 can include one or more processing components (alternatively referred to as "processors" or CPUs) configured to execute instructions related to one or more of the processes, steps, or actions described above in connection with one or more of the implementations disclosed herein. The processing unit 1002 can also include other auxiliary components, such as RAM and ROM. The computer-readable storage medium 1004 can be embodied by a non-transitory medium configured to store an operating system (OS) of the ITS station 1000 and various other computer-executable software programs for performing one or more of the processes, steps, or actions described above.

The wireless communication subsystem 1006 may be configured to provide wireless communications for data information or control information provided by the processing unit 1002. The wireless communication subsystem 1006 can include, for example, one or more antennas, a receiver, a transmitter, a local oscillator, a mixer, and a digital signal processing (DSP) unit. In some implementations, the subsystem 1006 can support multiple input multiple output (MIMO) transmissions. In some implementations, the receivers in the wireless communication subsystems 1006 can be an advance receiver or a baseline receiver. Two receivers can be implemented with identical, similar, or different receiver processing algorithms.

The user interface 1008 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 1010 can include, for example, a universal serial bus (USB) interface. A skilled artisan will readily appreciate that various other components can also be included in the example ITS station 1000.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

The invention claimed is:

1. A method, comprising:
   determining, by a network server, that an intelligent transportation system (ITS) station is misbehaving;
   in response to the network server determining that the ITS station is misbehaving:
      including, by the network server, information of the ITS station in a misbehaviour warning list (MWL); and transmitting, by the network server, a misbehaviour warning message to the ITS station indicating that the ITS station is misbehaving;
   after transmitting the misbehaviour warning message, determining, by the network server, whether the ITS station continues to misbehave after the network server transmitting the misbehaviour warning message, wherein the determining whether the ITS station continues to misbehave is based on:
      determining, by the network server, whether, after transmitting the misbehaviour warning message, the network server receives an indication from the ITS station indicating that a cause of misbehavior has been repaired; and
   in response to determining that the ITS station continues to misbehave after the misbehaviour warning message:
      removing, by the network server, the information of the ITS station from the MWL;
   including, by the network server, the information of the ITS station in a certificate revocation list (CRL), wherein the MWL is different than the CRL; and
   broadcasting, by the network server, the CRL that includes the information of the ITS station.

2. The method of claim 1, further comprising:
   determining, at the network server, that a second ITS station is misbehaving;
   in response to determining that the second ITS station is misbehaving, including information of the second ITS station in the MWL;
   transmitting a second misbehaviour warning message to the second ITS station indicating that the second ITS station is misbehaving; and
   in response to transmitting the second misbehaviour warning message and determining that the second ITS station is no longer misbehaving, removing the information of the second ITS station from the MWL.

3. The method of claim 2, further comprising:
   in response to transmitting the second misbehaviour warning message, receiving, from the second ITS station, a query message requesting information of misbehaviour.

4. The method of claim 2, wherein determining that the second ITS station is no longer misbehaving comprises receiving, from the second ITS station, an indication indicating that the second ITS station is no longer misbehaving.

5. The method of claim 1, wherein the misbehaviour warning message includes information regarding a nature of misbehaviour of the ITS station to permit the ITS station to identify a cause of misbehaviour.

6. The method of claim 1, wherein the information of the ITS station comprises at least a linkage seed associated with at least one certificate issued to the ITS station by a certificate authority.

7. The method of claim 6, wherein the at least one certificate is an elliptic-curve Qu-Vanstone (ECQV) implicit certificate.

8. The method of claim 1, wherein the ITS station is deployed on a vehicle.

9. A network server, comprising:
   a memory; and
   at least one hardware processor communicatively coupled with the memory and configured to:
   determine that an intelligent transportation system (ITS) station is misbehaving;
   in response to the network server determining that the ITS station is misbehaving:
      transmit a misbehaviour warning message to the ITS station indicating that the ITS station is misbehaving; and
      include information of the ITS station in a misbehaviour warning list (MWL);
   after transmitting the misbehaviour warning message, determine whether the ITS station continues to misbehave after the network server transmitting the misbehaviour warning message, wherein the at least one hardware processor is configured to determine whether the ITS station continues to misbehave based on determining whether, after transmitting the misbehaviour warning message, the network server receives an indication from the ITS station indicating that a cause of misbehaviour has been repaired; and in response to determining that the ITS station continues to misbehave after the misbehaviour warning message:
remove the information of the ITS station from the MWL;
include the information of the ITS station in a certificate revocation list (CRL), wherein the MWL is different than the CRL; and
broadcast the CRL including the information of the ITS station.

10. The network server of claim 9, wherein the at least one hardware processor is further configured to:
determine that a second ITS station is misbehaving;
in response to determining that the second ITS station is misbehaving, include information of the second ITS station in the MWL;
transmit a second misbehaviour warning message to the second ITS station indicating that the second ITS station is misbehaving; and
in response to transmitting the second misbehaviour warning message and determining that the second ITS station is no longer misbehaving, remove the information of the second ITS station from the MWL.

11. The network server of claim 10, wherein the at least one hardware processor is further configured to:
in response to transmitting the second misbehaviour warning message, receive, from the second ITS station, a query message requesting information of misbehaviour.

12. The network server of claim 10, wherein determining that the second ITS station is no longer misbehaving comprises receiving, from the second ITS station, an indication indicating that the second ITS station is no longer misbehaving.

13. The network server of claim 9, wherein the information of the ITS station comprises at least a linkage seed associated with at least one certificate issued to the ITS station by a certificate authority, and the at least one certificate is an elliptic-curve Qu-Vanstone (ECQV) implicit certificate.

14. A non-transitory computer-readable medium containing instructions which, when executed, cause a network server to perform operations comprising:
determining that an intelligent transportation system (ITS) station is misbehaving;
in response to the network server determining that the ITS station is misbehaving:
transmitting a misbehaviour warning message to the ITS station indicating that the ITS station is misbehaving; and
including information of the ITS station in a misbehaviour warning list (MWL);
after transmitting the misbehaviour warning message, determining whether the ITS station continues to misbehave after the network server transmitting the misbehaviour warning message, wherein the determining whether the ITS station continues to misbehave is based on:
determining whether, after transmitting the misbehaviour warning message, the network server receives an indication from the ITS station indicating that a cause of misbehaviour has been repaired; and
in response to determining that the ITS station continues to misbehave after the misbehaviour warning message:
removing the information of the ITS station from the MWL;
including the information of the ITS station in a certificate revocation list (CRL), wherein the MWL is different than the CRL; and
transmitting the CRL including the information of the ITS station.

15. The non-transitory computer-readable medium of claim 14, wherein the operations further comprise:
determining that a second ITS station is misbehaving;
in response to determining that the second ITS station is misbehaving, including information of the second ITS station in the MWL;
transmitting a second misbehaviour warning message to the second ITS station indicating that the second ITS station is misbehaving; and
in response to transmitting the second misbehaviour warning message and determining that the second ITS station is no longer misbehaving, removing the information of the second ITS station from the MWL.

16. The non-transitory computer-readable medium of claim 15, wherein the operations further comprise:
in response to transmitting the second misbehaviour warning message, receiving, from the second ITS station, a query message requesting information of misbehaviour.

17. The non-transitory computer-readable medium of claim 15, wherein determining that the second ITS station is no longer misbehaving comprises receiving, from the second ITS station, an indication indicating that the second ITS station is no longer misbehaving.

* * * * *